US006606533B1

(12) United States Patent
Whiting

(10) Patent No.: US 6,606,533 B1
(45) Date of Patent: Aug. 12, 2003

(54) METHOD AND ARRANGEMENT FOR CONTROLLING IMAGE SIZE OF INTEGRATED CIRCUITS ON WAFERS THROUGH POST-EXPOSURE BAKE HOTPLATE-SPECIFIC DOSE FEEDBACK

(75) Inventor: Charles A. Whiting, Milton, VT (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 09/688,329

(22) Filed: Oct. 12, 2000

(51) Int. Cl.$^7$ ............................................... G06F 19/00
(52) U.S. Cl. ..................................................... 700/121
(58) Field of Search ................................. 700/109, 121; 430/269, 270.1; 438/714, 715; 118/725; 219/443.1, 446.1

(56) References Cited

U.S. PATENT DOCUMENTS

| 4,264,712 A | 4/1981 | Kress |
|---|---|---|
| 4,409,319 A | 10/1983 | Colacino et al. |
| 4,988,284 A | 1/1991 | Liu et al. |
| 5,096,802 A | 3/1992 | Hu |
| 5,124,927 A | 6/1992 | Hopwell et al. |
| 5,286,607 A | 2/1994 | Brown |
| 5,385,809 A | 1/1995 | Bohrer et al. |
| 5,626,782 A | 5/1997 | Maeda |
| 5,647,650 A | 7/1997 | Daugherty et al. |
| 5,655,110 A | 8/1997 | Krivokapic et al. |
| 5,656,182 A | 8/1997 | Marchman et al. |
| 5,953,128 A | 9/1999 | Ausschnitt et al. |

Primary Examiner—Leo Picard
Assistant Examiner—Alexander Kosowski
(74) Attorney, Agent, or Firm—Scully, Scott, Murphy & Presser; William D. Sabo, Esq.

(57) ABSTRACT

A method and an arrangement for the processing of wafers on post-exposure bake hotplates along multiple processing paths, each of which may result in different integrated circuit images, and adjust the exposure dose based on the path through the process, so as to render the output and resultant image size of each path identical to each other and close to a target value.

8 Claims, 4 Drawing Sheets

Matrix of New Doses to Apply By Process Path

Image Size Dose Response  SLOPE "M" = 15 nm/mj y = 15x - 50

● Image Size (nm)
— Linear (Image Size (nm))

| Lot ID | Lot ID | Exposure Dose (mJ) | Process Path | Measured Image Size (nm) | Image Size Target (nm) | Slope "m" |
|---|---|---|---|---|---|---|
| Lot 1 | W1 | 20 | 1 | 260 | 250 | 15 |
| Lot 1 | W2 | 20 | 2 | 240 | 250 | 15 |
| Lot 2 | W1 | 19.33 | 1 | 250 | 250 | 15 |
| Lot 2 | W2 | 20.67 | 1 | 250 | 250 | 15 |
| Lot 3 | W1 | 19.33 | 1 | 250 | 250 | 15 |
| Lot 3 | W2 | 20.67 | 1 | 250 | 250 | 15 |

METHOD AND ARRANGEMENT FOR CONTROLLING IMAGE SIZE OF INTEGRATED CIRCUITS ON WAFERS THROUGH POST-EXPOSURE BAKE HOTPLATE-SPECIFIC DOSE FEEDBACK

BACKGROUND OF THE INVENTION

1. Field of the Invention

The present invention relates to a method and to an arrangement for the processing of wafers on post-exposure bake hotplates along multiple processing paths, each of which may result in different integrated circuit images, and to adjust the exposure dose based on the path through the process, so as to render the output and resultant image size of each path identical to each other and close to a target value.

In the current technology, semiconductor devices are fabricated through the intermediary of a single one or a multiplicity of post exposure bake hotplates on the basis of pluralities of simultaneously operating semiconductor wafer production lines. In essence, in order to maintain the quality and uniformity of the formed image sizes for the integrated circuits of the semiconductor devices, presently proposed systems have implemented measures which are designed to control the temperatures of the post-exposure bake hotplates. Among the various systems utilizing hotplate temperature control for post-exposure baking in order to control image size are the applicant's U.S. patent applications Ser. No. 09/314,368 and U.S. Ser. No. 09/361,451, which are commonly assigned to the assignee of the present application, and the disclosures of which are incorporated herein by reference. Both of these co-pending applications are directed to providing structure and methods for controlling the surface temperature of the hotplate which is used for post-exposure bake (PEB) so as to maintain the hotplate surface temperature variations within predetermined, narrowly specified bounds.

Virtually all deep UV (DUV) (248 nm), and subsequently developed lithography, such as those including 193 nm, EUV, X-ray and e-beam, employ chemically amplified resists. For chemically amplified resists, a typical process flow would essentially include the steps of:

1. Apply resist to wafer
2. Post-apply bake
3. Align/expose pattern
4. Post-expose bake
5. Develop pattern (ultimate image size).

The incident energy from the exposure releases a catalytic amount of acid, while the post-exposure bake (PEB) diffuses these acids, completes the desired chemical changes to the resist; in effect, either a deprotection for positive resist or a cross-linking for negative resists, and plays a major role in determining the ultimate resist image size. Resist image size response variations to the PEB can be substantial whereby typical numbers in the range of encountered variations are about 10–20 nm/(deg C).

As ground rules are tightened; for instance, such as sets of minimum feature sizes on a wafer, either in design or physically; essentially smaller semiconductor features which drive tighter tolerances, this places even more rigid demands on the precision in the temperatures of PEB hotplates. Even for current product, the range in variation for acceptable image size lots on some gate levels is less than 10 nm. This range in formation of image size is due to contributions from all kinds of effects, including exposure tool dose repeatability, developer normality, resist thickness, resist batch sensitivity repeatability, metrology, and PEB hotplate temperature. Consequently, the permissible contribution from any of these must be vanishingly small for acceptable manufacturability of the devices within specified production tolerances for the images on the wafers.

In addition to product quality requirements, there is also tremendous pressure in industry to increase throughput from lithography clusters. While some current DUV clusters provide for an output of about 30 wafers per hour (wph), new generation toolsets are presently being installed in industry wafer production lines which produce or even possibly exceed an output of about 80–100 wph. This averages out to a completed wafer being passed through the aligner every 35–45 seconds. However, the PEB processing step cannot be unduly accelerated or "rushed". Usually, this process step is fixed at a period of about one minute in order to provide an adequate process window and desired image characteristics. Thus, with the next generation of equipment, either the PEB must be allowed to gate the aligner, which is unlikely from an economic viewpoint since the wafer processing portion of the cluster is 5X less expensive than the aligner, or it becomes necessary to operate with more than one PEB hotplate; in essence, a plurality of wafer production paths.

However, operation with more than one PEB hotplate; i.e. in a plurality of concurrently operating wafer production paths, raises the extremely difficult problem of PEB hotplate matching. Typically combined accuracy/precision considered as a requisite for hotplate temperature tuning is on the order of +/−0.5 deg. C. Hence, if two PEB hotplates are adapted at the extremes of this range, it is quite possible that product from the two hotplates would receive PEB's which are an entire degree C apart, and thus would already be subjected to image size differences emanating solely from the PEB, of about 10–20 nm. This results in a completely unacceptable operating situation, so in fabricators running clusters with more than one PEB, frequent, high accuracy hotplate temperature checks are an absolute necessity. This procedure would most likely result in substantial time on the tool or tools being consumed with accuracy checks and adjustments instead of manufacturing throughput, thereby significantly adversely affecting the production economics.

2. Discussion of the Prior Art

Numerous publications pertaining to this technology address themselves in varying degrees of applicability to the problem of controlling image size of integrated circuits on wafers within specified bounds or tolerances; for example, during the post-exposure bake of integrated circuit-carrying wafers for semiconductor devices.

Ausschnitt et al U.S. Pat. No. 5,953,128 discloses a method of adjusting an exposure tool subsequent to the measuring of the dimensions of a developed image on a substrate of a semiconductor device. There is no disclosure of utilizing a post-exposure bake hotplate-specific dose feedback to provide for dosage control such that every path of a plurality of paths for the forming of specified image sizes on integrated circuit on semiconductor devices has the exposure adjusted so that all paths are at an optimum so as to be essentially indistinguishable from each other.

Dirksen et al U.S. Pat. No. 5,674,650 discloses a method of adjusting the illumination dose of an exposure tool based on a post-exposure bake. There is no feedback based on hot plate-specific conditions to vary the illumination dose whereby all paths of a plurality of wafer processing paths are adjusted so as to be optimally indistinguishable from each other.

Krivokapic et al U.S. Pat. No. 5,655,110 discloses a method of adjusting exposure following the measurements of images after etching. There is no dose feedback which is post-exposure bake hotplate-specific for a plurality of wafer processing paths which will render them optimally indistinguishable.

Marchman et al U.S. Pat. No. 5,656,182 and Hopewell et al. U.S. Pat. No. 5,124,927 each disclose adjusting the exposure tool and/or post-bake tool based on the measurements of latent images at each respective tool. There is no post exposure bake hotplate-specific dose feedback for a plurality of wafer processing paths product which is being processed. In particular, Marchman, et al., is directed to a process for fabricating a device wherein control is provided by a near-field imaging latent effect which is introduced into energy-sensitive resist material. This effects a control over resist process parameters, wherein one of the parameters relates to post-exposure baking.

Maeda U.S. Pat. No. 5,626,782 is concerned with a post exposure baking apparatus for forming fine resist integrated circuit line patterns on semiconductor wafers. In particular, this patent provides a capability for an evaluation in the changes of linewidth, and calculation methods for the temperatures in order to obtain desired linewidths for the integrated circuits, and for this purpose incorporates a plurality of heating components which are independently temperature-controlled.

Bohrer et al. U.S. Pat. No. 5,385,809 and Brown U.S. Pat. No. 5,286,607 each disclose photoresist materials which provide for minimum shrinkage to impose exposure bake. There is no disclosure of utilizing dose feedback which is hotplate-specific after post-exposure baking so as to be able to render every path of a plurality of wafer production paths adjustable so as to be optimally indistinguishable from each other.

Concerning various other patent publications, such as U.S. Pat. No. 5,139,904 this monitors the dimensions of feature on a wafer after exposure, post exposure baking development and etching; whereas U.S. Pat. No. 5,096,802 discloses controlled shrinkage of feature sizes at bake; U.S. Pat. No. 4,988,284 discloses predevelopment baking of photoresist layers for compensating for the e-beam proximity effect; U.S. Pat. No. 4,409,309 discloses controlled baking to obtain desired feature and image dimensions; and U.S. Pat. No. 4,264,712 discloses a method of circulating air over a hotplate at post-exposure bake to eliminate hot spots. None of these patents are directed to dose feedback determined in a hotplate-specific manner subsequent to post-exposure bake in order to adjust each and every path of a plurality of wafer production paths by adjusting the dose based on the path through the process, so as to render the output of each path in the forming of image sizes on the wafers identical to each other and close to a target value.

SUMMARY OF THE INVENTION

Although the foregoing manufacturing process in producing images on printed circuits is generally satisfactory in utilization with single hotplates, it is an intent of the invention to provide a system which, rather than utilizing sensors for controlling the temperature of the hotplate, particularly; for instance, where multiple post-exposure baking hotplates are adapted to be employed, for achieving a greater degree of uniformity in the image size of integrated circuits, by controlling the dosage of the ultraviolet radiation or illumination to which the integrated circuits are exposed prior to conducting the semiconductor devices onto specified wafer production paths of various multiple tools or hotplates. This is accomplished by post-exposure bake (PEB) hotplate-specific illumination dosage feedback, for the processing of wafers on post-exposure bake hotplates along multiple processing paths, each of which may result in different integrated circuit images, and to adjust the exposure dose based on the path through the process, so as to render the output and resultant image size of each path identical to each other and close to a target value.

In essence, none of the prior art publications as described herein above are directed to the provision of multiple post-exposure hotplates being run in a cluster without prohibitive amounts of time having to be expended on hotplate temperature cross-calibration. In order to provide the foregoing processing advantages for high speed and multi-tool hotplate installations, the present invention is directed to a novel concept of providing illumination dose feedback which is hotplate-specific for post exposure baking.

Accordingly, pursuant to the inventive concept, in the fabrication of semiconductor wafers wherein it is intended to control the image size of integrated circuits on the wafers within specified parameters or tolerances so as to impart a high degree of precision to the wafer image sizes, for the processing of wafers on post-exposure bake hotplates along multiple processing paths, each of which may result in different integrated circuit images, and to adjust the exposure dose based on the path through the process, so as to render the output and resultant image size of each path identical to each other and close to a target value It is accordingly an object of the present invention to provide an arrangement for the fabrication of semiconductor wafers wherein the image size of integrated circuits on the wafers is controlled through post-exposure bake hotplate-specific illumination dose feedback.

A further object of the present invention is to provide an arrangement for the processing of wafers on post-exposure bake hotplates along multiple processing paths, each of which may result in different integrated circuit images, and to adjust the exposure dose based on the path through the process, so as to render the output and resultant image size of each path identical to each other and close to a target value.

A further object resides in the provision of a method for fabricating semiconductor wafers including the controlling of image size of integrated circuits on the wafers through post-exposure bake hotplate-specific dose feedback.

Another object resides in the provision of a method for the processing of wafers on post-exposure bake hotplates along multiple processing paths, each of which may result in different integrated circuit images, and to adjust the exposure dose based on the path through the process, so as to render the output and resultant image size of each path identical to each other and close to a target value.

BRIEF DESCRIPTION OF THE DRAWINGS

Reference may now be had to the following detailed description of a preferred embodiment of the invention, taken in conjunction with the accompanying drawings; in which.

DETAILED DESCRIPTION OF A PREFERRED EMBODIMENT

Reverting in detail to an arrangement 10 for the processing or manufacturing of semiconductor wafers, and wherein in order to provide the appropriate integrated circuit images, an exposure tool 12 is equipped with different wafer production or processing paths 1, 2–n each, respectively, receiving illumination doses D1, D2–Dn imparted to respective semiconductor wafers $W_1$–$W_N$ in order to form the IC images.

After the semiconductor wafer $W_1$, $W_2$–$W_N$ of a respective wafer production path is discharged from the applicable exposure tool 12; subsequent to exposure, post-exposure bake (PEB) and develop operations, the semiconductor wafer W with the integrated circuit image formed thereon is forwarded to a line width metrology equipment unit 14. Each respective semiconductor wafer W emanating from the various processing paths 1, 2–n respectively is measured to provide value $X_1$, $X_2$,–$X_n$. which are stored in a matrix from which they can be retrieved for later use in calculations.

To determine the dose response of the resist, the image size in units of nanometers (nm) is plotted as ordinate versus the dose in milliJoules per square centimeter (mJ) as abscissa. This provides a slope m with resulting units of (nm/mJ), representing the linearized image size response to incident ultraviolet illumination exposure. Using the dose response slope m, target image size value $x_{target}$, and image size $x_i$ for a given path, a new path-specific dose $D_i$ is calculated for this path using the expression: $D_{i,new}=D_{i,old}+(X_{target}-X_i)/m$. These path-specific doses $D_i$ are stored in a matrix for later retrieval. When a wafer is subsequently processed and will follow path "i", the dose required for this path $D_i$ is then used for this wafer exposure, providing an optimized image width and quality within specified parameters and tolerances.

Figure 1:
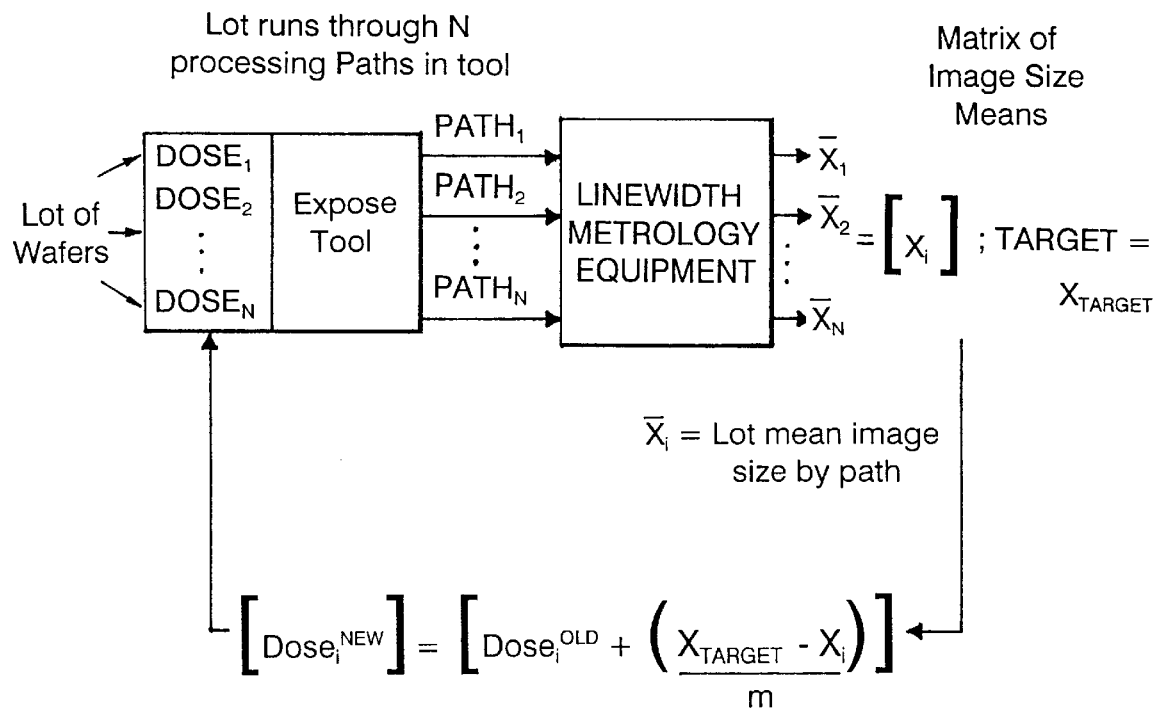
FIG. 1 illustrates, generally diagrammatically, an arrangement for processing semiconductor wafers and for controlling image size of integrated circuits formed thereon through post-exposure bake hotplate-specific dose feedback.
Figure 2:
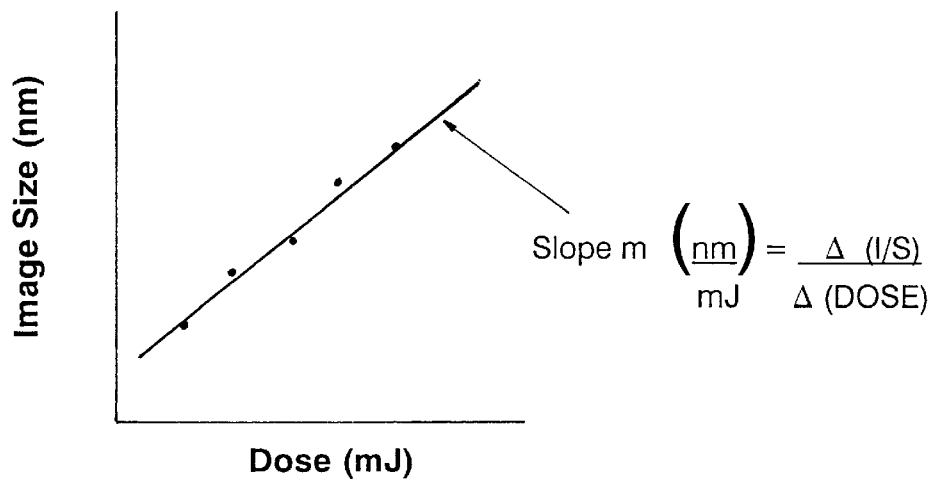
FIG. 2 illustrates a graphical representation of a matrix of new illuminating doses which are to be applied to optimize the process.

As plotted in the graph of FIG. 2, the image size has the ordinate nm tabulated versus the abscissa dose (MI) providing a slope m which is defined by (nm/mJ)=ΔI/S÷Δ(dose); wherein nm is the images size and mJ is the dose of the ultraviolet illumination exposure.

The foregoing process enables a precise control over image size of integrated circuits formed on semiconductor wafers without having to constantly vary the temperatures of the hotplate to which the semiconductor device is conveyed subsequent to exposure while using dosage adjustment based on feedback information of image size to permit identical output from multiple hotplates despite temperature differences between them.

In essence, a typical scenario of a processing path for a particular semiconductor wafer may be as follows:

1. The path for a given wafer entering the resist processing cluster must be specifiable in the cluster software as the wafer enters the tool. This could be as simple as systematically alternating wafers, or could include a more complex "look-forward" system.

2. As each wafer enters the track, read and record the barcode and store with its unique path through the system.

3. When the wafer is exposed on the aligner, record the reticle and dose assigned to the wafer and store/associate it with the previously recorded barcode and path.

4. Finally, when the wafer control image is measured (typically SEM), record and associate the image size with the recorded dose and path for this wafer barcode.

5. When the next lot using this reticle arrives at this cluster, adjust dose for each unique path through the system, adjusting (for example) for a "cool" hotplate by increasing dose for every wafer which uses this path through the system.

6. Optionally, when dose between different paths differs by more than a certain percentage, the system will issue an alarm alerting maintenance personal that path processing differences are excessive and require equipment actions.

While the feed-forward controls would most compactly be implemented in a photo cluster, they could conceivably be used in a more integrated fashion, i.e., with a known, predictable path through a series of operations and modules such as a photo/etch tool combination.

The invention compensates for pathwise variation in processing in a photo cluster by identifying image size differences and individually compensating for these path differences using feedforward dose adjustment. Current state of the art adjusts only by tool, not path through tool, and can result in multiple different populations of product exiting from the tool with the same nominal processing conditions. To prevent these multiple populations of product, equipment maintenance must constantly measure and adjust (for example) PEB hotplates to keep them within a few tenths of a degree of each other.

A sequence of a typical process as described hereinabove, on the basis of two wafer processing or productions paths 1 and 2, is now elucidated as set forth hereinbelow:

Provided are:

1. Two paths through a lithography tool, Processing path 1 and Processing Path 2.

2. Assume, for simplicity's sake, three product lots, Lot 1, Lot 2 and Lot 3; and that each lot contains two wafers, Wafer 1 and Wafer 2.

3. Assume that, given the same exposure dose, that wafers sent through Path 1 and path 2 differ in image size by 20 nanometers (nm). One cause of this could be a temperature difference in the post-exposure bake (PEB) modules between Path 1 and path 2.

4. Assume that a dose of 20 mJ causes the combined population mean of Path 1 and Path 2 to coincide with an image size target of, for example 250 nm.

The current state of the art does not differentiate between the outputs between Path 1 and path 2. Because the current art only adjusts dose based on the combined output of both Path 1 and Path 2, the output of one path will be 10 nm above the target; the output of the second path 10 nm below target, but the mean of the combined distributions will be zero. This results in a bimodal distribution.

In order to apply the invention, the following procedures are performed:

1. Determine the image size dose response by, referring to FIG. 3:

Exposing a series of wafers or exposure fields on wafers using a range of doses

Measuring the image size of a control structure using a metrology means such as scanning electron microscope, for each of the doses Plotting the image size as ordinate versus dose as abscissa, with (for example), image size in nanometers (nm) and dose in milliJoules per square centimeter (mJ)

Fitting a line to this data, extracting the slope "m" of the line as the image size dose sensitivity; in this case, a value of 15 nm/mJ is obtained.

Figures 3, 4:
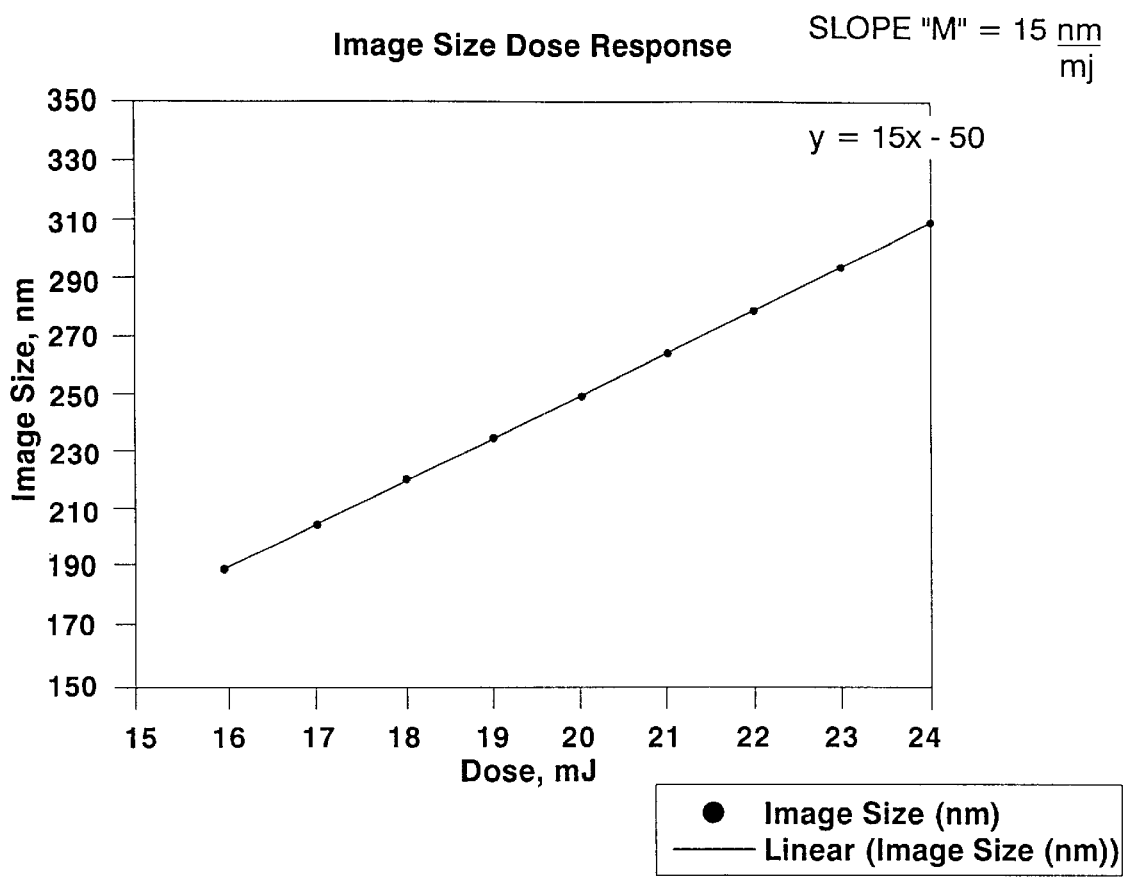
FIG. 3 illustrates a more detailed graphical representation similar to FIG. 2 which is specific to a particular operative example of the invention.
FIG. 4 illustrates a chart of a record corresponding to wafer production paths stored in a database.

Store slope "m" in database (FIG. 4)

2. As a starting point, expose both Wafer 1 and Wafer 2 of Lot 1 with exposure dose 20 mJ. Record Lot 1D, Wafer ID's and respective doses for each wafer in database (FIG. 4)

3. Process Wafer 1 through Process Path 1, and Wafer 2 through Process Path 2. Record the corresponding path choices in database (FIG. 4)

4. Following processing, measure image size of a control structure on Wafer 1 and Wafer 2 using a metrology means such as a scanning electron microscope.

Record the measurements X1 and X2, associated respectively with Wafer 1 and Wafer 2, in database (FIG. 4). In this example, x1=260 nm and x2=240 nm.

5. Record image size target (example, 250 nm) in database.

6. Start processing of Lot 2. Wafer 1, using predictive means cited in disclosure, will be processed on Processing Path 1. Calculate a corrected dose for this path by:

Retrieve dose from previous run on Process Path 1 from database:

Dose(old)=20 mJ

Retrieve measured image size {260 nm}, target image size {250 nm} and slope "m" {15 nm} from database Calculate new dose Dose(new)=Dose(old)+(target image size-measured image size)/(Slope m)=20 mJ+ (250 nm−260 nm)/(15 nm/mJ)=19.33 mJ Expose Lot 2, Wafer 1 with dose of 19.33 mJ Repeat data storage and metrology procedures form steps 2, 4 and 5.

7. Continue processing of Lot 2. Wafer 2, using predictive means cited in disclosure, will be processed on Processing path 2. Calculated a corrected dose for this path by Retrieve dose form previous run on Process Path 2 from database:

Dose(old)=20 mJ

Retrieve measured image size {240 nm}, target image size {250 nm} and slope "m" {15 nm} from database Calculate new dose Dose(new)=Dose(old)+(Target image size-measured image size)/(Slope m)=20 mJ+ (250 nm−240)/(15 nm/mJ)=20.67 mJ Expose Lot 2, Wafer 2 with dose of 20.67 mJ Repeat data storage and metrology procedures from steps 3, 4 and 5 above.

8. Start processing of Lot 3. Wafer 1, using predictive means cited in disclosure, will be processed on Processing Path 1. Calculated a corrected dose for this path by:

Retrieve dose from previous run on Process Path 1 from database:

Dose(old)=19.33 mJ

Retrieve measured image size {250 nm−250 nm} and slope "m" {15 nm} from database Calculate new dose Dose(new)=Dose(old)+(Target image size-measured image size)/(Slope m)=19.33 mJ+(250 nm−250 nm)/(15 nm/mJ)=19.33 mJ Expose Lot 3, Wafer 1 with dose of 19.33 mJ Repeat data storage and metrology procedures from steps 2, 4 and 5 above.

9. Continue processing of Lot 3. Wafer 2, using predictive means cited in disclosure, will be processed on Processing Path 2. Calculated a corrected dose for this path by:

Retrieve dose from previous run on Process path 2 from database:

Dose(old)=20.67 mJ

Retrieve measured image size {250 nm}, target image size {250 nm} and slope "m" {15 nm} from database Calculate new dose Dose(new )=Dose(old)+(Target image size-measured image size)/(Slope m)=20.67 mJ+(250 nm−250 nm)/(15 nm/mJ)=20.67 mJ Expose Lot 3, Wafer 2 with dose of 20.67 mJ 10. Repeat data storage and metrology procedures from steps 3, 4 and 5 above.

11. Continue with ensuing production lots using steps similar to steps 8–10 above.

12. Additional embodiment: Note that the dose difference between Path 1 and Path 2 is 20.67 mJ–19.33 mJ=1.34 mJ. This gives a numeric indication of the differences between Path 1 and path 2. A software limit (example, 2 mJ) may be placed where a maximum tolerable difference in dosing between Path 1 and path 2 is defined. If the Dose(Path 1)–Dose(Path 2) exceeds 2 mJ, an alarm or other notification may be issued, wither preventing further processing or alerting maintenance personnel that action is required to converge processing conditions.

1. Using the current state of the art, a unique dose was applied to wafers regardless of which processing path would be taken. This would result in two populations of image size produced on the product, both deviating from the target. (Refer to FIG. 5).

Figure 5:
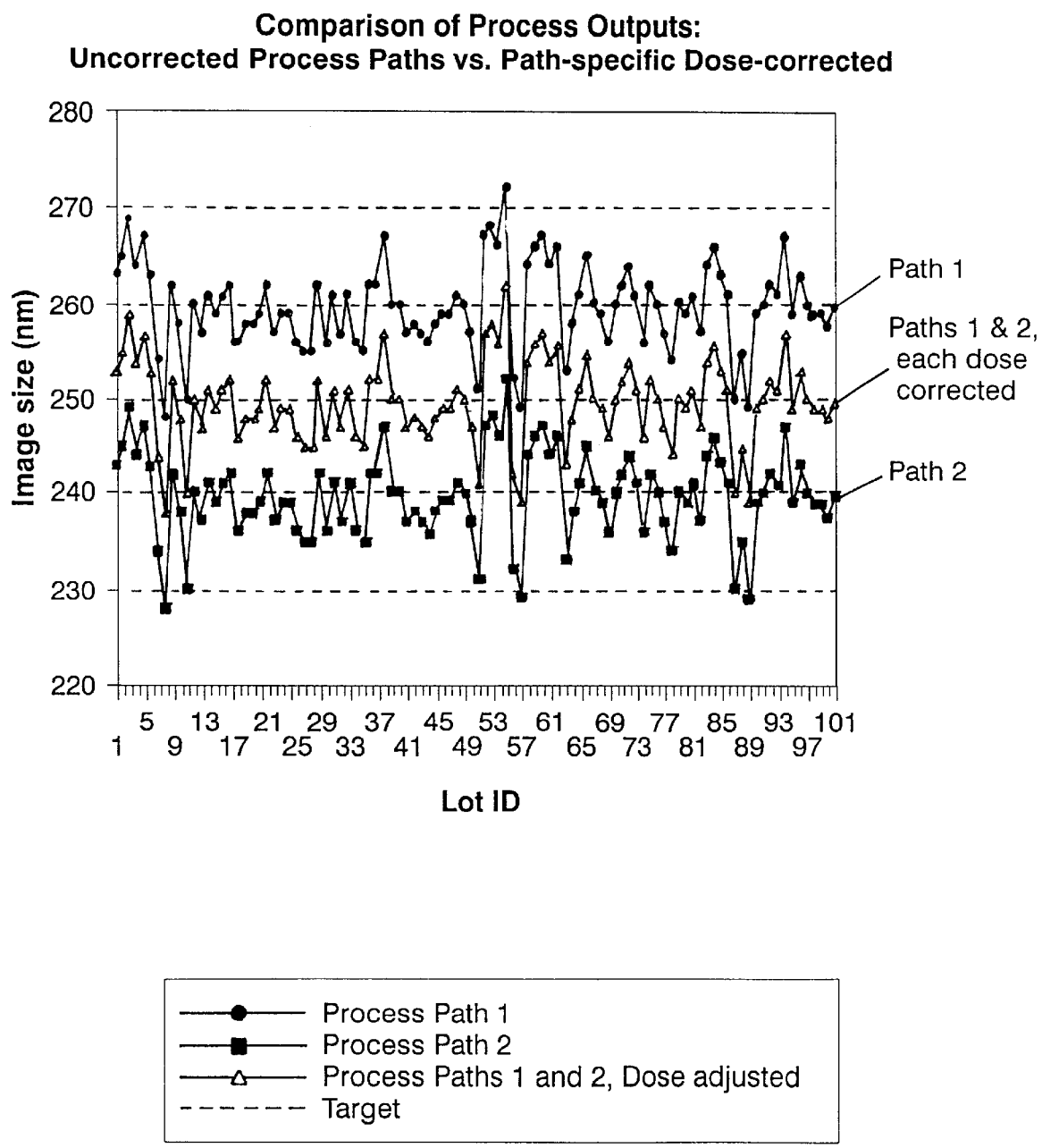
FIG. 5 illustrates a chart of populations of image sizes from two wafer production paths.

2. Using the invention, different doses (examples, 19.33 mJ and 20.67 mJ) are applied to the wafers, based on knowledge of which processing path will be taken. This will result in a single population of image sizes produced on the product, all centered at the target (FIG. 5).

Figure 6:
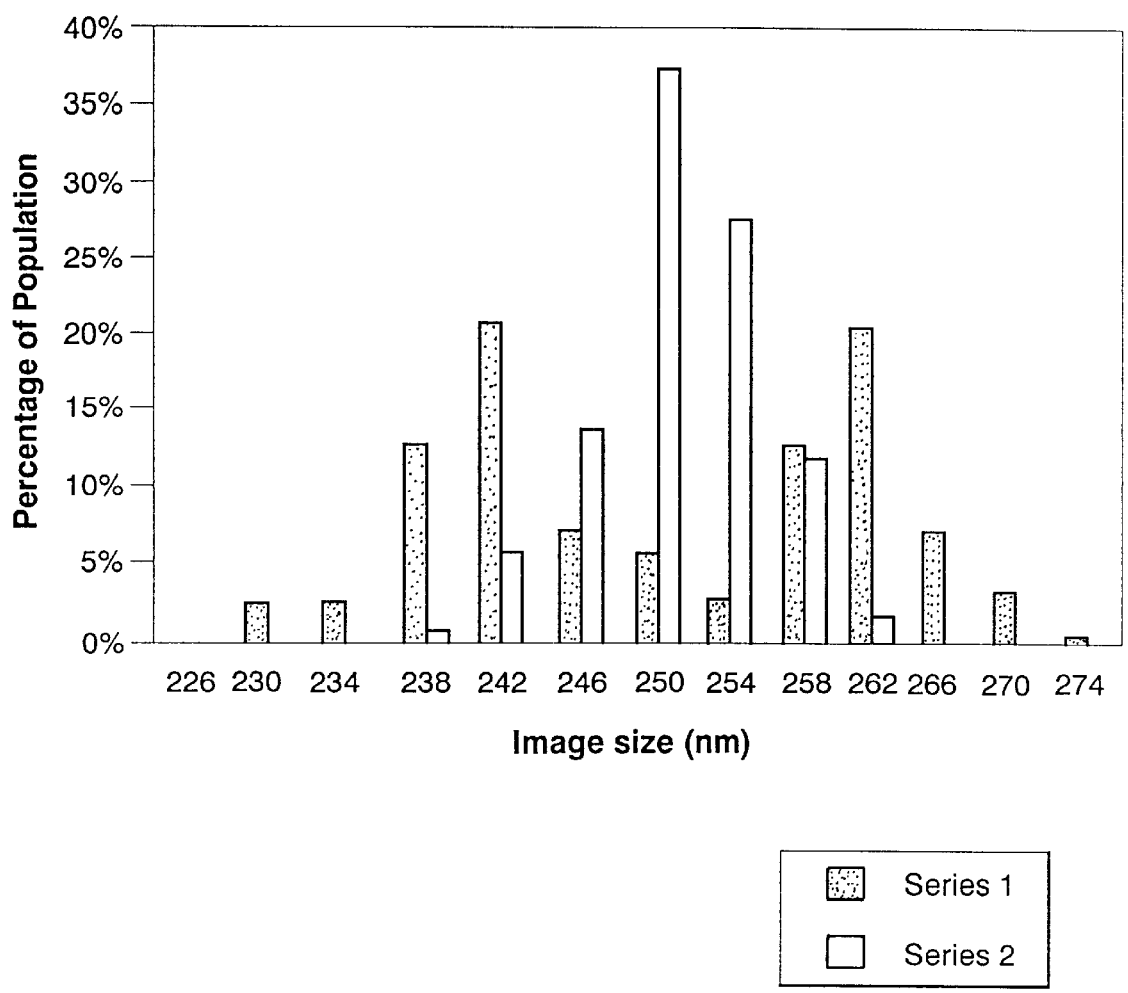
FIG. 6 illustrates histogram of the image size outputs from FIG. 5.

3. Another way of viewing this difference is to compare a histogram of these outputs, as shown in FIG. 6. This compares the bimodal distribution of the single-dose, two-path output to the dose-corrected, two-path output. Note that while both have a mean equal to the target, the deviation from the mean for the path-specific dose correction distribution is substantially smaller.

While this invention has been particularly shown and described with respect to preferred embodiments thereof, it will be understood by those skilled in the art that the foregoing and other changes in form and detail may be made without departing from the spirit and scope of the present invention. It is therefore intended that the present invention not be limited to the exact forms described and illustrated, but fall within the scope of the appended claims.

What is claimed is:

1. An arrangement for controlling the image size of integrated circuits formed by an exposure dose on a semiconductor wafer conducted along multiple wafer production paths through the intermediary of post-exposure bake hot plate-specific dose feedback, said arrangement comprising:

(a) means for measuring the image linewidth of said integrated circuits at least at one location on the surface of each said wafer conducted along each of said multiple wafer production paths;

(b) means for plotting and correlating the image line measurement values obtained on each of said wafer production paths with previously plotted image linewidth measurements data so as to determine differentials in the formed integrated circuit image sizes along the respective wafer production paths; and (c) means for adjusting the exposure dose based on the path of at least one of said multiple wafer production paths responsive to a measured difference between said image linewidth values so as to render the output and resultant image size formed on the wafers along each of said wafer production paths substantially identical to each other; and wherein said image linewidth measuring means comprise computation means for a matrix of measured image sizes to provide a comparison with previously calibrated image size values for said multiple wafer production paths.

2. An arrangement as claimed in claim 1, wherein said means for adjusting the exposure dose maintains image sizes on the wafer surfaces of the multiple wafer production paths within predetermined narrowly specified tolerances.

3. An arrangement for controlling the image size of integrated circuits formed by an exposure dose on a semiconductor wafer conducted along multiple wafer production paths through the intermediary of post-exposure bake hot plate-specific dose feedback, said arrangement comprising:

(a) means for measuring the image linewidth of said integrated circuits at least at one location on the surface of each said wafer conducted along each of said multiple wafer production paths;

(b) means for plotting and correlating the image line measurement values obtained on each of said wafer production paths with previously plotted image linewidth measurements data so as to determine differentials in the formed integrated circuit image sizes along the respective wafer production paths; and (c) means for adjusting the exposure dose based on the path of at least one of said multiple wafer production paths responsive to a measured difference between said image linewidth values so as to render the output and resultant image size formed on the wafers along each of said wafer production paths substantially identical to each other; and wherein said means for adjusting the exposure dose for each of said multiple wafer production paths forms the integrated circuit image sizes close to a specified image size target value and causes a desired image linewidth size to be subtracted from previously processed lots of wafers for each computed image linewidth size data to form a matrix of image size deviations from a nominal image size across the wafer surfaces.

4. An arrangement as claimed in claim 3, wherein the image size deviation changes computed from nominal image sizes are derived for the wafers surface by dividing the image size deviation matrix by a slope plotted from an exposure dose-dependent graph versus image size so as to determine exposure dose correlation for each said hot plate responsive to hot plate-specific dose feedback.

5. A method for controlling the image size of integrated circuits formed by an exposure dose on a semiconductor wafer conducted along multiple wafer production paths through the intermediary of post-exposure bake hot plate-specific dose feedback, said method comprising:

(a) measuring the image linewidth of said integrated circuits at least at one location on the surface of each said wafer conducted along each of said multiple wafer production paths;

(b) plotting and correlating the image line measurement values obtained on each of said wafer production paths with previously plotted image linewidth measurements data so as to determine differentials in the formed integrated circuit image sizes along the respective wafer production paths; and (c) adjusting the exposure dose based on the path of at least one of said multiple wafer production paths responsive to a measured difference between said image linewidth values so as to render the output and resultant image size formed on the wafers along each of said wafer production paths substantially identical to each other; and wherein said image linewidth measuring step comprises computing a matrix of measured image sizes to provide a comparison with previously calibrated image size values for said multiple wafer production paths.

6. A method as claimed in claim 5, wherein providing for a correlation between dose feedback which is hot plate-specific maintains image sizes on the wafer surfaces of the multiple wafer production paths within predetermined narrowly specified tolerances.

7. A method for controlling the image size of integrated circuits formed by an exposure dose on a semiconductor wafer conducted along multiple wafer production paths through the intermediary of post-exposure bake hot plate-specific dose feedback, said method comprising:

(a) measuring the image linewidth of said integrated circuits at least at one location on the surface of each said wafer conducted along each of said multiple wafer production paths;

(b) plotting and correlating the He line measurement values obtained on each of said wafer production paths with previously plotted image linewidth measurements data so as to determine differentials in the formed integrated circuit image sizes along the respective wafer production paths; and (c) adjusting the exposure dose based on the path of at least one of said multiple wafer production paths responsive to a measured difference between said image linewidth values so as to render the output and resultant image size formed on the wafers along each of said wafer production paths substantially identical to each other; and wherein said adjusting the exposure dose for each of said multiple wafer production paths causes the integrated circuit image sizes to be formed close to a specified image size target value; and wherein for attaining image size target value causes a desired image linewidth size to be subtracted from previously processed lots of wafers for each computed image linewidth size data to form a matrix of image size deviations from a nominal image across the wafer surfaces.

8. A method as claimed in claim 7, wherein the image size deviation changes computed from nominal image sizes are derived for the wafers surface by dividing the image size deviation matrix by a slope plotted from an exposure dose-dependent graph versus image size so as to determine exposure dose correlation for each said hot plate responsive to hot plate-specific dose feedback.

* * * * *